United States Patent [19]

Batistoni et al.

[11] 4,425,491

[45] Jan. 10, 1984

[54] METHOD OF AUTOMATIC WELDING

[75] Inventors: Michel Batistoni, Dracy-le-Fort; Alain Georges, Verdun sur le Doubs, both of France

[73] Assignee: Framatome, Courbevoie, France

[21] Appl. No.: 291,677

[22] Filed: Aug. 10, 1981

[30] Foreign Application Priority Data

Aug. 19, 1980 [FR] France .................. 80 18124

[51] Int. Cl.$^3$ ........................................... B23K 9/225
[52] U.S. Cl. ................... 219/60.2; 219/125.1
[58] Field of Search ............ 219/60.2, 61, 130.5, 219/125.1

[56] References Cited

U.S. PATENT DOCUMENTS 4,359,621 11/1982 Monley .................. 219/60.2

OTHER PUBLICATIONS

"Bendix Numerical-Control System Developed for Contour Type Fusion Welding," *Machinery*, Feb., 1963, pp. 136–137.

*Primary Examiner*—B. A. Reynolds
*Assistant Examiner*—Alfred S. Keve
*Attorney, Agent, or Firm*—Pollock, Vande Sande & Priddy

[57] ABSTRACT

A method of continuous welding of a series of tubes to a tube sheet, in which the torch current is decreased to produce partial fading of the arc after completion of the first welding bead, and the torch is then moved to a starting position on a second contour to be welded. A stationary preheat is then effected, and a second weld bead is made by following the second contour to be welded. The process continues until the last bead has been made, whereupon the arc is switched off.

2 Claims, 2 Drawing Figures

METHOD OF AUTOMATIC WELDING

FIELD OF THE INVENTION

The object of the invention is a method of making a great number of weld beads in the form of independent, spaced contours, and the invention especially applies to continuous welding of a series of tubes to a tube sheet.

BACKGROUND

To weld tubes to a tube sheet, particularly in making heat exchangers constituted by a great number of tubes the ends of which engage in orifices pierced in a tube sheet, an automatic welding head is generally used, comprising a torch and means for displacing the torch in several directions to allow it to follow each contour to be welded, one after the other.

There are various systems of welding, but the automatic stage of the method is most often limited to welding of a single contour. An operator must therefore set the welding head over the tube to be welded and place the torch on the starting point for the first bead, then strike the arc, welding then being carried out by automatic displacement of the torch along the contour to be welded. When welding is completed, it is usual to go past the starting point so as to obtain an overlap. The operator then stops the torch and switches off the arc, then positions the welding head on the next tube. The operator is thus obliged to intervene at the end of the welding of each bead in order to place the welding head over the next tube and position the torch at the starting point of the new bead to be welded. This operation is tricky and lengthy. The arc must also be struck and then switched off at the end of the bead, each time a bead is made. These transitory stages are difficult to monitor and can involve local faults, protuberances due to striking flash or microcraters when the arc is extinguished.

There is also a known method of continuous welding which consists in placing plugs in all the tubes, allowing simple welding passes to be made over the whole of the sheet, the tubes then being rebored. This method considerably increases the length of the weld beads and necessitates machining afterwards.

The object of the invention is a new method of welding allowing these problems to be solved by effecting continuous and automatic welding.

SUMMARY OF THE INVENTION

According to the invention, after striking of the arc and positioning of the torch on the first contour to be welded, and then making of the first welding bead, have been effected in a known way, the torch current is decreased to obtain a partial fading out of the arc, so that this remains struck without melting the piece, and then displacement of the torch is effected as far as a starting position on a second contour to be welded. At this point, a stationary preheat is effected by controlling return to welding current, the second weld bead is made by following the second contour to be welded, the torch current is then decreased to obtain a further partial fading out of the arc, a further displacement of the torch is effected as far as a starting point on a third contour to be welded, a stationary preheat is carried out at this point by returning to welding current, the third bead is then made and so on, transfer from one contour to the other and adjustment of welding parameters being carried out automatically until the last bead has been made, when the arc is switched off.

In a particular embodiment, the beads to be welded having the shape of closed contours, after the torch has been positioned on the starting point of a bead and a stationary preheat has been effected, the bead is made by following the contour and, after the starting point has been passed to achieve overlap, the arc current is decreased and then, with the arc partially faded out, following of a part of the contour above the bead already made is then continued as far as a point at which displacement of the torch to the following bead is effected.

To weld to a tube sheet a plurality of tubes whose ends are aligned in several parallel rows, the torch is positioned at the side and on the axis of the first row, the arc is struck and the torch is displaced along the axis as far as a point $A1$ positioned on the contour of the first tube to be welded and, after a stationary preheat has been effected at this point $A1$, the bead is made by following the whole contour and going past the point $A1$ as far as a point $B1$ at which the current is decreased so as to partially fade out the arc, the torch whose arc is partially faded out is then displaced by following the contour as far as a point $C1$ diametrically opposite $A1$, then along the axis of the row as far as a point $A2$ positioned on the contour of the second tube of the row, welding of the second tube is effected in the same way as far as a point $B2$, the torch is displaced, arc partially faded out, as far as a point $C2$ on the axis of the row, then along the axis to the third tube and so on as far as the last tube (n) of the first row and the torch is displaced, arc partially faded out, along the bead made as far as a point $C_n$ from which displacement of the torch is effected onto the axis of the second row, then along this axis, as far as a point $A'1$ positioned on the end tube of the said second row and welding of the tubes is effected in the same way, and so on for the following rows.

Preferably, automatic displacements of the torch and adjustment of welding parameters are effected by means of a numerical control or microprocessor installation.

BRIEF DESCRIPTION OF THE DRAWINGS

The invention will now be described in more detail with reference to the attached drawings which relate to welding of a series of tubes to a tube sheet, by way of example.

DETAILED DESCRIPTION

Figure 1:
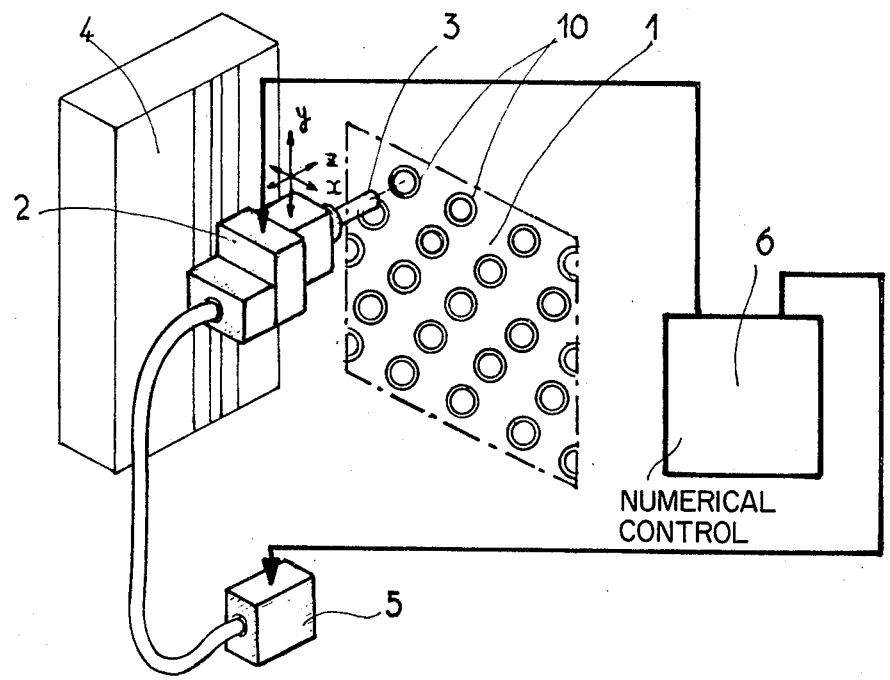
FIG. 1 represents diagrammatically the whole of the installation used for implementing the method.

In FIG. 1, a part of a tube sheet 1 has been represented diagrammatically on which the ends of tubes 10 are to be welded by means of a welding head 2 provided with a torch 3.

The welding head 2 is able to move in a known way on a support 4 in at least three directions x, y, z.

The welding head 2 is also connected to a welding set 5 which supplies the torch with welding current, protective gas, and cooling fluid. This welding set 5 also assures the functions of striking and switching off of the arc and is generally able to adjust welding parameters and especially arc current.

The welding set is preferably of the T.I.G. type used for welding tube sheets since the melting region is very localized and very stable.

The machine 4 for positioning the welding head 2 is controlled by numerical control by an installation 6 which controls the displacement of the torch along at least two controlled axes in contour tracing to execute a plane trajectory. A third axis can be added for continuous control of welding current strength.

In addition, the installation 6 can also allow the welding set 5 to be controlled by numerical program.

Figure 2:
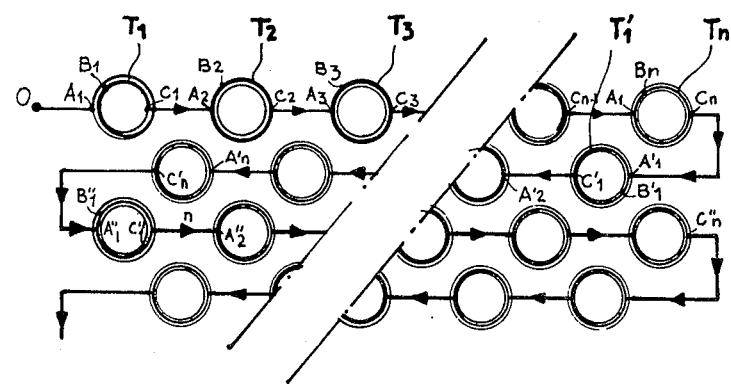
FIG. 2 represents diagrammatically, viewed from above, the path of the torch to weld a series of tubes.

Welding of the different tubes according to the invention proceeds in the manner represented diagrammatically in FIG. 2. The torch 3 is positioned by an operator at a point 0 at the side of the tube sheet, near the first tube T1 of the first row and on the axis of this.

The welding head is then moved until the torch is above a point A1 on the contour to be welded of the tube T1. The arc is then struck at A1 unless it has already been started at 0, and a timed stationary preheat is effected at the point A1 to welding current.

The numerical welding stage then follows, following the whole contour to be welded of the tube T1, the point A1 is returned to and, in a known way, an overlap is obtained by going past the point A1 as far as B1. At this point the welding set 5, controlled by the numerical control 6, effects partial fading out of the arc. It is thus possible, without damaging the bead already made, to pass over this by effecting the displacement of the torch to the point C1 diametrically opposite the point A1.

With the arc still faded out, the torch then moves along the axis of the row of tubes as far as the point A2 positioned on the following tube T2. This displacement can leave a mark on the tube sheet but this is not a problem as the arc is partially faded out.

At this point A2, the welding set 5 controlled by the fixed installation again effects a stationary preheat to welding current and the torch then moves along the contour of the tube T2 to make the second weld bead as far as a point B2 located slightly beyond A2. In the same way as before, the welding current is reduced at this point to effect a partial fading out of the arc and the torch moves above the bead made as far as C2, then, at this point, along the axis of the row as far as A3 on the tube T3. The tubes of the first row are thus welded one after the other as far as the last tube Tn.

With the arc faded out, as previously, at Bn, the bead already made is followed as far as a point Cn where the arc is moved to pass on to the axis of the second row, with the arc faded out. This axis is then followed to A'1 on the first tube T'1 of the second row. At this point, a timed stationary preheat is effected and then the weld bead is made as far as B'1. The arc is then faded out and is moved in this state as far as C'1, and then A'2 on the following tube. All the tubes of the second row are thus done one after the other and then, in the same way as before, the third row is reached.

When all the rows have been effected successively in this way, the arc is completely faded out and switched off after welding of the last tube.

It is established that, while using a conventional automatic welding installation, welding of all the tubes is effected automatically and continuously, by means of the method according to the invention, the operator having to intervene only at the beginning and end of the work.

As the welding parameters are controlled entirely by numerical control, it is possible to work with a standard T.I.G. welding set.

In addition, this numerical controlling of welding parameters and the trajectory allows them to be modified to optimize the characteristics of the bead.

As movement is assured by conventional machine tool kinematic chains, the problems of miniaturized heads, particularly mechanical play and lack of rigidity, are avoided. In addition, the smoothness of the motorization and the welding cycle without total arc interruption allow very regular beads to be made.

This method of welding is normally only applied in cases when the torch is perpendicular to the welding plane. It would however be possible, in the case of welding with electrodes inclined with respect to the welding plane or with filler wire, to add a motorized head between the machine and the torch which would assure complementary movements.

Furthermore, the invention is in general not limited to the details of the embodiment just described.

In particular, to improve the work rate, it would be possible to use several welding torches moved by the same kinematic, since, in the case of welding a tube sheet, the welds to be made are repetitive and identical. Similarly, in the case of pieces presenting geometric irregularities on the assembly to be welded, a known tracing apparatus or a known apparatus for correcting the trajectory of the torch could be added to the installation. Such an apparatus would allow welds to be made along independent contours which are not entirely identical. Furthermore, if the invention is particularly adapted to welding tube sheets, it can also be used in other applications whenever a great number of weld beads need to be made on contours which are independent of each other, these contours possibly not being closed. The welding cycle described is actually the one best adapted to welding several rows of circular contours, but other sequences could be used by altering the path which allows the torch to pass successively above all the contours to be welded. Similarly, the position of the characteristic points, initial striking points, stationary preheat points, points of ending overlap and beginning fading out, and points of beginning and ending transfer, could be altered, without exceeding the scope of the invention.

We claim:

1. Method of welding to a tube sheet the ends of a plurality of tubes aligned in several parallel rows, by means of an automatic welding apparatus comprising a welding torch and automatically controlled means for displacing said torch, along two substantially perpendicular axes, in a plane trajectory comprising, for each tube, a circular path following the contour of the tube, and a rectilinear path to the succeeding tube, said method comprising the steps of
   (a) positioning said torch at the side and on the axis of a first of said parallel rows;
   (b) striking an arc;
   (c) displacing said torch along said axis as far as a point $A_1$ positioned on the contour of a first tube to be welded;
   (d) effectuating a timed stationary preheat at said point $A_1$;
   (e) making a bead by following the entire said contour and going past said point $A_1$ as far as a point $B_1$ where the applied current is diminished to partially fade out said arc;

(f) displacing said torch, with its arc faded out, by following said contour as far as a point $C_1$ diametrically opposite point $A_1$, then along said axis of said first row as far as point $A_2$ positioned on the contour of a second tube of said row;

(g) effecting welding in the same manner as far as a point $B_2$;

(h) displacing said torch, with the arc faded out, as far as a point $C_3$ on the axis of said first row, and so on as far as the last tube $T_n$ of said first row;

(i) displacing said torch, its arc faded out, along said bead as far as a point $C_n$;

(j) effecting displacement of said torch onto the axis of a second of said rows, then along said axis to a point $A'_1$ positioned on the outer tube of said second row; and (k) effecting welding of the tubes in said second and succeeding rows in the same manner.

2. Method of welding according to claim 1, wherein the automatic displacements of said torch and adjustments of welding parameters are numerically controlled.

* * * * *